Dec. 7, 1954          M. O. PETROFF          2,696,592
                       VIBRATION PICKUP
                      Filed May 5, 1951
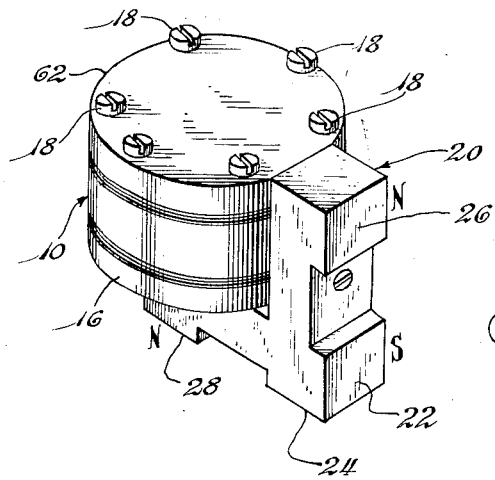
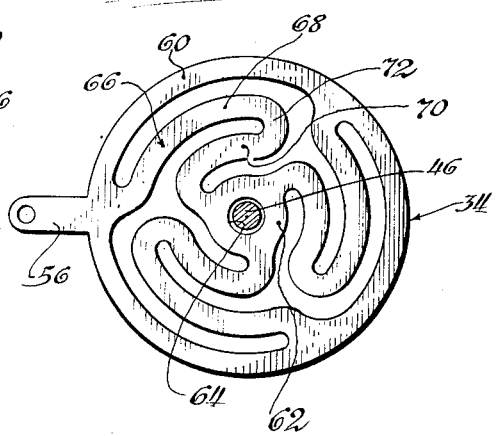
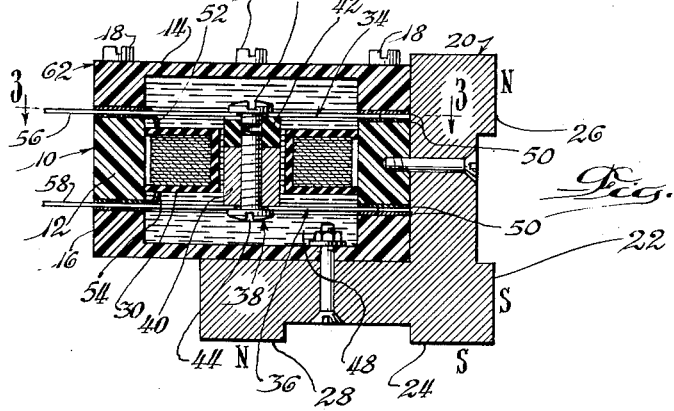
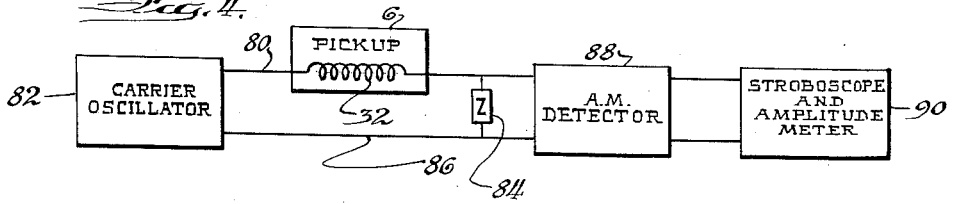
Inventor:
Merlin O. Petroff
By Ahlberg, Hupper & Gradolph
Attorneys.

United States Patent Office 2,696,592
Patented Dec. 7, 1954

2,696,592

VIBRATION PICKUP

Merlin O. Petroff, Round Lake, Ill., assignor to Stewart-Warner Corporation, Chicago, Ill., a corporation of Virginia Application May 5, 1951, Serial No. 224,798

4 Claims. (Cl. 336—30)

This invention relates to inertia operated pickups for providing electrical signals which vary in accordance with vibrations of a body.

An object of the invention is to provide an improved inertia operated pickup which responds effectively to extremely low frequency vibrations.

A further object is to provide an improved inertia operated vibration pickup including a vibratory system having an extremely low natural resonant frequency.

A further object is to provide an improved pickup which is particularly adapted for sensing the vibrations of a vehicle wheel which is being balanced.

A further object is to provide an improved inertia operated vibration pickup adapted to modulate an alternating current carrier in accordance with vibrations of a body.

A further object is to provide an improved inertia operated vibration pickup which is extremly compact, easily constructed, economical, and free from unnecessary complications.

Further objects, advantages and features of the invention will become apparent from the following description of an illustrative embodiment of the invention. In the course of the description, reference will be made to the accompanying drawings in which:

Fig. 1 is a perspective view illustrating the external appearance of an inertia operated pickup constructed in accordance with the invention;

Fig. 2 is a central longitudinal sectional view of the pickup;

Fig. 3 is a transverse sectional view taken as indicated by the line 3—3 in Fig. 2 and illustrating particularly one of the suspension springs forming a part of the pickup; and Fig. 4 is a diagrammatic illustration of a complete vibration responsive apparatus including the pickup.

As shown in Fig. 1, the illustrative pickup 6 includes a generally cylindrical casing 10 comprising a cylindrical ring 12 having its opposite ends closed by a pair of cup-shaped covers 14 and 16. The casing assembly 10 is clamped together by a plurality of longitudinal bolts 18. A permanent magnet 20 is bolted to the casing 10 to provide means for securing the pickup to a vibrating body such as an axle or a brake backing plate in a vehicle wheel assembly. The permanent magnet 20 is L-shaped to provide two south magnetic pole surfaces 22 and 24 at right angles to each other on the outer surfaces of the heel of the L and two north magnetic pole surfaces 26 and 28 on the outer surfaces of the extremities of the L. The pickup casing 10 is nested in the angle of the L-shaped magnet 20.

As shown in Fig. 2, a spool 30 carrying a coil 32 is tightly fitted into the casing ring 12. Two flat generally circular springs 34 and 36 are clamped between the ends of the ring 12 and the respective covers 14 and 16. A core assembly 38 positioned within the spool 30 is carried by the springs 34 and 36. The core assembly 38 includes a metallic cylinder or slug 40, which preferably has a relatively great magnetic permeability, and a cylinder or spacer 42 which may have a relatively small magnetic permeability, arranged end to end between the springs 34 and 36. The cylinder or slug 40 may be made of iron and the cylinder or spacer 42 may be made of an electrically insulating resinous material. The slug 40 and the spacer 42 may be clamped between the springs by means of a bolt 44 which extends through the spring 36 and the slug 40 and which is threaded into the spacer 42, together with a bolt 46 which extends through the spring 34 and is threaded into the spacer 42.

The casing may be filled with a viscous damping oil 48. Gaskets 50 are provided to prevent leakage of oil between the ring 12 and the covers 14 and 16.

The coil 32 has end leads 52 and 54 which are connected to the springs 34 and 36 respectively. The springs include outwardly extending radial lugs 56 and 58 forming external electrical connections to the coil 32. The casing ring 12 and the covers 14 and 16 may be made of an electrically insulating material to avoid short-circuiting the springs 34 and 36. The insulating spacer 42 prevents the core assembly 38 from short-circuiting the springs 34 and 36.

The springs 34 and 36 have a special configuration as shown in Fig. 3. Each of the springs 34 and 36 includes an outer flat ring 60 adapted to be clamped between the casing ring 12 and one of the covers 14 and 16. Each of the springs has a central generally circular disc-shaped portion 62 for carrying the core assembly 38. The central portion 62 has an axial aperture 64 to receive one of the bolts 44 or 46.

The central disc 62 is connected with the outer ring 60 by means of a plurality of curved loops 66, three loops being illustrated. Each of the loops includes an outer clockwise portion 68 and a doubled back counterclockwise inner portion 70. An elbow portion 72 connects the outer portion 68 with the inner portion 70.

In Fig. 4 one end of the coil 32 of the pickup 6 is connected to one of the output leads 80 of a carrier producing oscillator 82. The oscillator may produce signals having a frequency in the neighborhood of 15 to 30 kilocycles. A load impedance 84 is connected between the other end of the coil 32 and the other output lead 86 of the oscillator 82. Thus the oscillator, the pickup coil 32 and the load impedance 84 are in series.

The input of an amplitude modulation detector 88 is connected across the load impedance 84. The output of the amplitude modulation detector is connected to a utilization circuit 90 which may include an amplitude meter as well as a stroboscope to illuminate the vibrating body for determining the location of the center of unbalance of the body.

The pickup is operated by attaching it to a vibrating body in such a way as to produce axial vibrations of the casing 10. The permanent magnet 20 provides one particularly convenient arrangement for attaching the pickup to a magnetically permeable vibrating body. The L-shaped magnet 20 provides means to attach the pickup to a surface with the axis of the casing 10 either at right angles to the surface or parallel therewith. Thus the pickup is adapted to sense vibrations either perpendicular or parallel to the surface.

Axial vibrations of the casing 10 produce vibrations of the core assembly 38 with respect to the coil 32, because of the inertia of the core assembly, and particularly the inertia of the slug 40. The springs 34 and 36 provide restoring forces biasing the core assembly 38 against movement in either direction.

The slug 40 is positioned off-center in the coil 32 so that axial movement of the slug in one direction moves the slug farther into the coil 32, and axial movement of the slug in the other direction moves the slug out of the coil 32. Consequently vibratory movements of the slug produce corresponding variations in the inductive reactance of the coil 32.

The particular spring arrangement illustrated in Fig. 3 provides long and compliant spring arms 66 so that the natural resonant frequency of the vibrating system including the springs 34 and 36 and the massive core assembly 38 may be very low, less than 20 or 25 C. P. S. for example. Consequently the pickup responds effectively to extremely low frequencies. Moreover, the variations in the inductive reactance of the coil 32 correspond closely to the instantaneous vibrational displacement of the casing 10 over a wide frequency range extending to very low frequencies.

The viscosity of the oil 48 filling the casing 10 may be such as to provide critical damping of the vibrating system including the springs 34 and 36 and the core assembly 38. The damping provided by the oil minimizes spurious responses by the pickup and provides more uniform response to vibrations having widely different frequencies.

The electrical connections to the coil 32 are conveniently brought out by means of the lugs 56 and 58 on the springs 34 and 36.

In the arrangement of Fig. 4, the carrier current through the load impedance 84 due to the carrier oscillator 82 is controlled by the impedance of the pickup coil 32. Vibratory variations in the inductive reactance of the pickup coil cause amplitude modulation of the carrier current. The amplitude modulation detector 88 demodulates the voltage across the impedance 84 and produces electrical signals corresponding to the vibrational variations of the inductance of the coil 32. The signals from the detector 88 may be used to operate an amplitude meter and to flash a stroboscope in synchronization with the vibrational signals from the detector 88.

An unusually compact construction results from utilizing the core assembly both as a vibrating weight and as an inductance varying element. The compactness of the pickup is further enhanced by supporting the vibrating weight inside the coil between flat circular springs.

The component parts of the pickup may be made and assembled readily and economically. There are no closely fitting sliding parts. The pickup assembly is rugged and dependable.

Many of the details of the embodiment described above are merely illustrative and should not be taken as limitative. The invention may be embodied in many equivalent arrangements. The scope of the invention is indicated by the following claims.

I claim:

1. In an inertia operated vibration pickup, a housing comprising a cylindrical supporting ring, a cylindrical coil carried coaxially inside the ring, a core assembly positioned inside the coil, a pair of flat generally circular springs carrying the opposite ends of the core assembly, a pair of housing covers closing the opposite ends of the ring and clamping the springs between the ring and the covers, a viscous damping liquid immersing the springs and the core assembly, and a magnetic slug and a nonmagnetic spacer stacked end to end in the core assembly, the magnetic slug being axially displaced with respect to the planes of the ends of the coils, each of the springs including a plurality of loops forming long pliant spring arms.

2. In an inertia operated vibration pickup, a generally ring-shaped coil assembly including a hollow cylindrical coil having two terminals, a pair of flat generally circular springs secured to the opposite ends of the coil assembly and electrically connected to the coil terminals respectively, a magnetically permeable core carried axially inside the coil assembly by the springs, and a nonmagnetic and insulating spacer secured between one end of the core and one of said springs whereby the core is axially displaced with respect to the coil.

3. In an inertia operated vibration pickup, a ring-shaped coil assembly including a ring-shaped housing and a hollow cylindrical coil centrally positioned therein, a pair of flat generally circular springs having their outer edges secured to the opposite ends of the coil assembly, each of said rings having an uninterrupted peripheral edge portion, a small disc-like central portion, and a plurality of tortuous looped parts connecting the peripheral edge portion with the central portion; and a core assembly carried between the central portions of the springs and positioned axially inside the coil assembly, the core assembly including a magnetically permeable slug and a nonmagnetic spacer stacked end to end, and whereby the slug is held axially displaced with respect to the coil.

4. In an inertia operated vibration pickup, a casing including a generally cylindrical insulating ring and a pair of covers closing the opposite ends of the ring, a coil mounted inside the ring, a pair of flat generally circular springs clamped between the covers and the ring, the coil having end terminal leads connected to the springs respectively, an insulating core assembly carried axially inside the coil between the springs, respective lugs on the springs forming external electrical connections thereto, and a viscous damping liquid filling the casing.

References Cited in the file of this patent

UNITED STATES PATENTS

| Number | Name | Date |
|---|---|---|
| 2,387,223 | Carson | Oct. 16, 1945 |
| 2,424,724 | Tolk | July 29, 1947 |
| 2,430,757 | Conrad et al. | Nov. 11, 1947 |
| 2,509,210 | Clark | May 30, 1950 |
| 2,533,249 | Henson | Dec. 12, 1950 |
| 2,540,796 | Stanton | Feb. 6, 1951 |
| 2,570,672 | Hathaway | Oct. 9, 1951 |